June 1, 1965  E. FUHRMANN  3,186,384

PISTON SEAL FOR ROTARY ENGINES

Filed June 29, 1961

Inventor:
Ernst Fuhrmann.
By [signature]
Atty.

United States Patent Office 3,186,384
Patented June 1, 1965

3,186,384
PISTON SEAL FOR ROTARY ENGINES
Ernst Fuhrmann, Burscheid, near Cologne, Germany, assignor to Goetzewerke Friedrich Goetze Aktiengesellschaft, Burscheid, near Cologne, Germany, a corporation of Germany
Filed June 29, 1961, Ser. No. 120,739
Claims priority, application Germany, June 30, 1960, G 29,949
2 Claims. (Cl. 123—8)

This invention is concerned with a piston seal for rotary engines, made of strip-like elements and the like.

A known seal for pistons of rotary engines employs strip-like elements disposed in grooves formed in the piston. Assembled segment-like strips seal the piston at the flanks with respect to the housing, while the zenith points of the piston are sealed by straight strips. The strips provided at the zenith points of the piston are by centrifugal force pressed against the wall of the cylinder, thereby producing a relatively good seal.

The surfaces of the strips which are subjected to sliding action are, as seen in cross section, rounded, and the sliding surface thereof can thus be made very small, so that the strips engage the counter surface with increased specific pressure. The curvature of the strips can have a common center point, and each strip will in such case have at least one sharp edge which will be effective to respectively seal the combustion gases and the fluids in particularly efficient manner.

It is advantageous to provide for the sealing strips or sealing limits intended for the flanks of the rotary piston, an axially effective tensioning spring disposed between the base of the groove and the back of the sealing strips, so as to hold the sealing parts always in engagement with the counter slide surface. A plurality of sealing strips are preferably loaded by one tensioning spring.

The various objects and features of the invention will appear from the following description of embodiments shown in the accompanying drawing.

Figure 1:
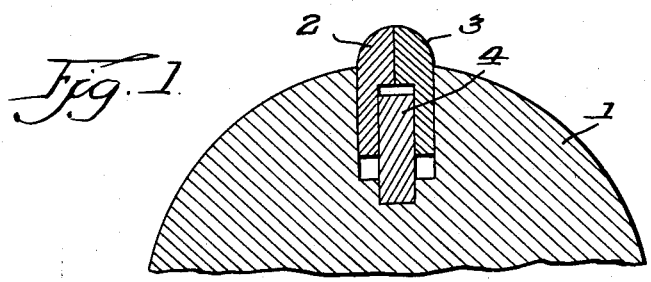
FIG. 1 shows a seal comprising two sealing strips with a spacing member disposed in the back thereof.

Referring now to FIG. 1, the piston 1 is at its zenith point sealed by the sealing strips 2 and 3, which are rearwardly recessed so as to accommodate a spacing member 4 which is operative for guiding the strips 2 and 3. These strips 2 and 3 have their inner end portions in grooves on each side of the spacing member and their outer end portions projecting from the piston. The outer end portions are in face contacting relation to each other and overlie the end of the spacing member in spaced relation thereto.

Figure 2:
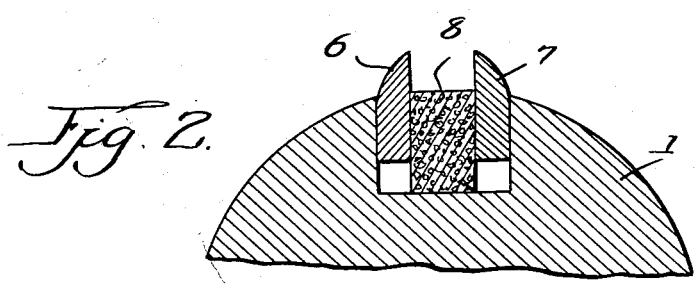
FIG. 2 shows a seal comprising two sealing strips separated by an intermediate porous spacing member.

In FIG. 2, the piston 1 is sealed by the strips 6 and 7 which lie spaced apart in grooves formed in the piston 1. Between the strips 6 and 7 is provided a porous spacer member 8 forming a part of the piston, such spacer member being adapted to carry a lubricant. The arcuate slide surfaces of the strips 6 and 7 have a common center point, resulting, due to the spaced apart arrangement thereof, in sharp edges which provide a particularly effective sealing action.

Figure 3:
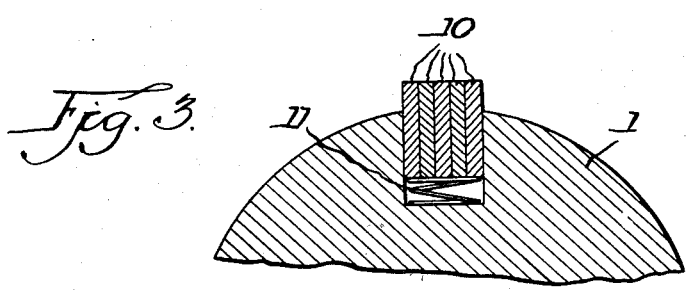
FIG. 3 shows another form of a laminated seal comprising a plurality of strips.

The piston 1 in FIG. 3 is sealed by a laminated structure comprising a plurality of strips 10 which are pressed against the corresponding counter surface by means of a spring 11.

Changes may be made within the scope and spirit of the appended claims which define what is believed to be new and desired to have protected by Letters Patent.

I claim:

1. A piston seal for a rotary engine, comprising a piston having a groove therein having two parallel faces and a bottom wall, a spacing member positioned centrally of said groove and extending from the bottom of said groove and having two faces spaced from and parallel to said groove faces, said spacing member being of porous material and carrying a lubricant, a plurality of strip-like sealing elements slidably disposed within said groove in mutually parallel relationship, one of said sealing elements intermediate one side of said groove and the adjacent face of said spacing member, and a second of said sealing elements intermediate said other face of said groove and the adjacent face of said sealing member, inner edges of said sealing elements being spaced from said bottom wall of said groove, portions of said elements extending from said piston and forming slide seal surfaces which in transverse section are rounded along lines having a common center point, spaced from the center points of the piston and the cylinder.

2. A piston seal for a rotary engine, comprising a piston having a first groove therein having two parallel faces and a bottom wall, a spacing member positioned centrally of said groove and extending from the bottom of said groove and having two faces spaced from and parallel to said groove faces, said spacing member being of a rigid material and being fixed in a second groove formed in the bottom well of said first groove, two strip-like sealing elements slidably disposed within said groove in mutual parallel relationship, one of said sealing elements intermediate one side of said groove and the adjacent face of said spacing member, and a second of said sealing elements intermediate said other face of said groove and the adjacent face of said sealing member, the inner edges of said sealing elements being spaced from said bottom wall of said groove, portions of said elements extending from said piston and forming slide seal surfaces, said portions being enlarged in that they are wider than the portion of said sealing elements intermediate said groove faces and said spacer faces, said enlarged portions extending toward and slidably abutting each other, thereby overlying the end of said spacing member and being in spaced relation thereto.

References Cited by the Examiner

UNITED STATES PATENTS

| | | | |
|---|---|---|---|
| 342,721 | 5/86 | Wood | 123—8 |
| 605,585 | 6/98 | Phillips | 91—140 |
| 649,095 | 5/00 | Zura | 123—8 |
| 694,763 | 3/02 | Liethegener et al. | 123—8 |
| 705,835 | 7/02 | Grove | 91—140 |
| 735,943 | 8/03 | De Chardonnet | 123—8 |
| 1,636,486 | 7/27 | Planche | 123—8 |
| 1,776,452 | 9/30 | Rosenthal | 123—8 |
| 2,345,561 | 4/44 | Allen | 123—8 |
| 2,990,109 | 6/61 | Fraser | 230—152 |
| 3,082,747 | 3/63 | Luck | 123—8 |

FOREIGN PATENTS 1,008,529   2/52   France.

JOSEPH H. BRANSON, JR., *Primary Examiner.*
KARL J. ALBRICHT, *Examiner.*